United States Patent [19]
Hayashi et al.

[11] Patent Number: 5,649,184
[45] Date of Patent: Jul. 15, 1997

[54] SYMMETRIC/ASYMMETRIC SHARED PROCESSING OPERATION IN A TIGHTLY COUPLED MULTIPROCESSOR

[75] Inventors: Katsumi Hayashi, Mishima; Masaaki Mitani; Yutaka Sekine, both of Numazu; Tomohiro Hayashi, Mishima; Kazuhiko Saito; Yoshinori Shimogai, both of Numazu, all of Japan

[73] Assignee: Fujitsu Limited, Kawasaki, Japan

[21] Appl. No.: 495,982

[22] Filed: Mar. 20, 1990

[30] Foreign Application Priority Data

Mar. 20, 1989 [JP] Japan ................................. 1-068814
Mar. 20, 1989 [JP] Japan ................................. 1-068815

[51] Int. Cl.$^6$ ................................................ G06F 17/30
[52] U.S. Cl. ...................... 395/608; 395/674; 395/675; 395/474
[58] Field of Search ..................... 364/DIG. 1, DIG. 2; 395/325, 200, 608, 674, 675, 474

[56] References Cited

U.S. PATENT DOCUMENTS

| | | | |
|---|---|---|---|
| 4,186,438 | 1/1980 | Benson et al. | 395/600 |
| 4,189,771 | 2/1980 | Roever | 395/650 |
| 4,245,306 | 1/1981 | Besemer et al. | 395/325 |
| 4,320,451 | 3/1982 | Bachman et al. | 395/650 |
| 4,484,262 | 11/1984 | Sullivan et al. | 395/425 |
| 4,494,193 | 1/1985 | Brahm et al. | 395/200 |
| 4,574,350 | 3/1986 | Starr | 395/725 |
| 4,591,977 | 5/1986 | Nissen et al. | 395/200 |
| 4,648,035 | 3/1987 | Faua et al. | 395/400 |
| 4,707,781 | 11/1987 | Sullivan et al. | 395/425 |
| 4,709,325 | 11/1987 | Yajima | 395/575 |
| 4,754,400 | 6/1988 | Wakahara et al. | 395/575 |
| 4,843,542 | 6/1989 | Dashiell et al. | 364/200 |
| 5,058,006 | 10/1991 | Durdan et al. | 395/325 |
| 5,123,101 | 6/1992 | Sindu | 395/400 |
| 5,142,683 | 8/1992 | Burkhardt, Jr. et al. | 395/725 |
| 5,251,308 | 10/1993 | Frank et al. | 395/425 |

FOREIGN PATENT DOCUMENTS 0286807  10/1988  European Pat. Off. ......... G06F 9/46

OTHER PUBLICATIONS

Obermarck, Ron, "Distributed Deadlock Detection Algorithm", *ACM Trans Database Sys* vol. 7 No. 2 Jun. 1982 pp. 187–208.

Nitzberg et al., "Distributed Shared Memory: A Survey of Issues and Algorithms", *Computer* vol. 24, No. 8 Aug. 1991, pp. 53–60.

Date, C. J., "An introduction to database systems", vol. II, *Addison–Wesley*, Reading, MA, Chap. 7, pp. 309–322.

European Search Report, The Hague, May 3, 1993.

*Primary Examiner*—Thomas G. Black
*Assistant Examiner*—Paul R. Lintz
*Attorney, Agent, or Firm*—Staas & Halsey

[57] ABSTRACT

In a data base processing system using a multiprocessor system, the data base processing system includes: a storage unit provided in the shared memory for storing data base management information representing either an object of a shared processing operation or an object of a local processing operation for every resource; an access management unit provided in each of the processor modules for performing an access control for an access request to the data base under either the shared processing operation or the local processing operation in accordance with the data base management information, the shared processing operation being symmetrically performed, and the local processing operation being asymmetrically performed in each processor module; and a control unit provided in the processor module for controlling the shared/local conversion in such a way that: an access state of the resource is managed for every resource; when a frequency of the access is unevenly distributed to a particular processor module, the resource of that processor module is determined as the object of the local processing operation at that particular processor module; and when the frequency of the access is not unevenly distributed to a particular processor module, the resource of a particular processor module is determined as the object of the shared processing operation. The data base processing system further includes a deadlock detection system.

6 Claims, 17 Drawing Sheets

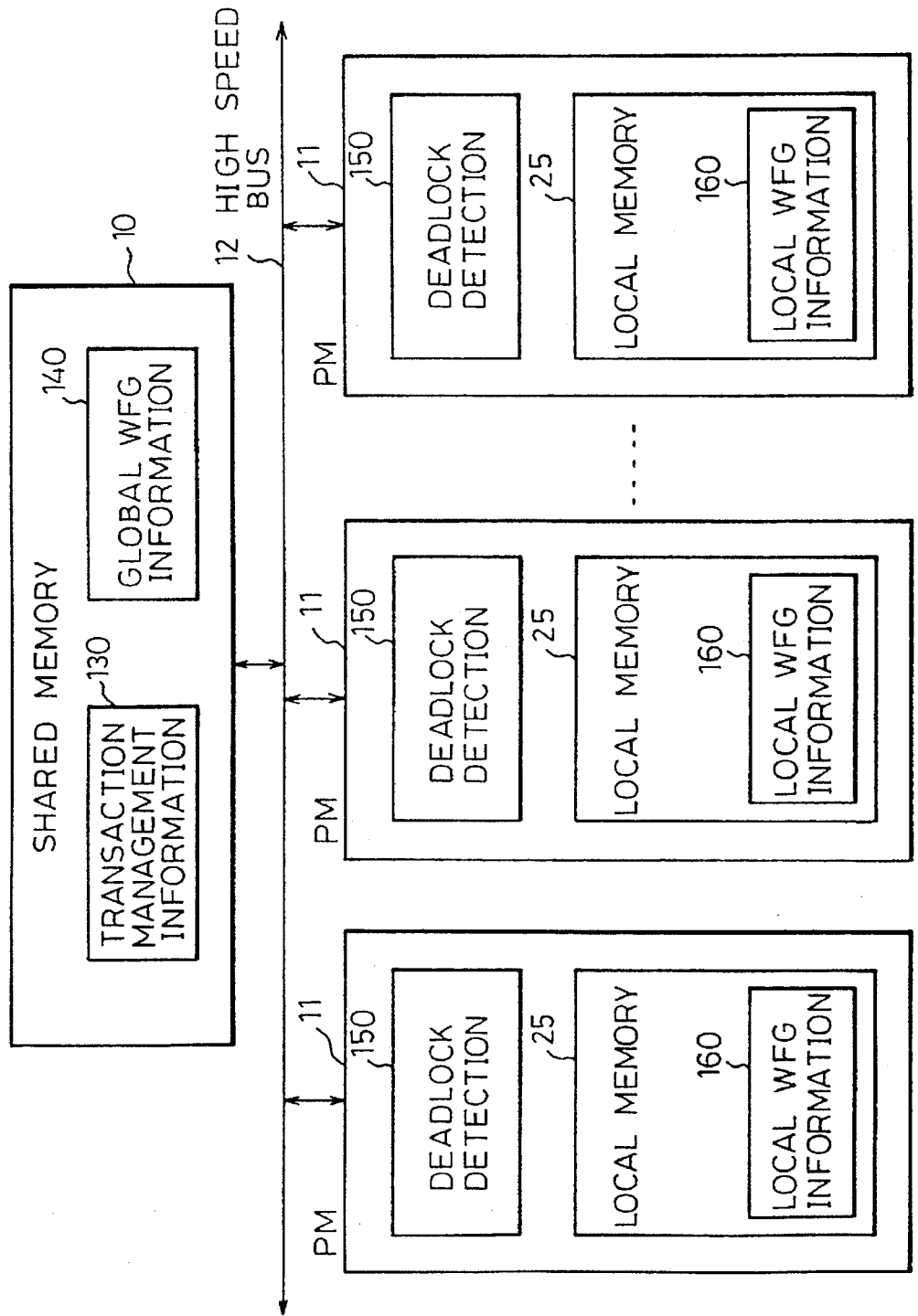

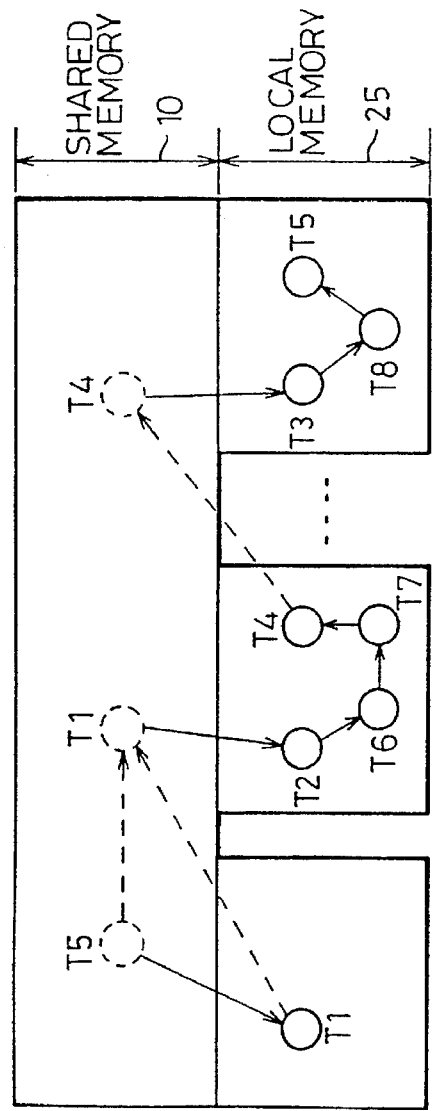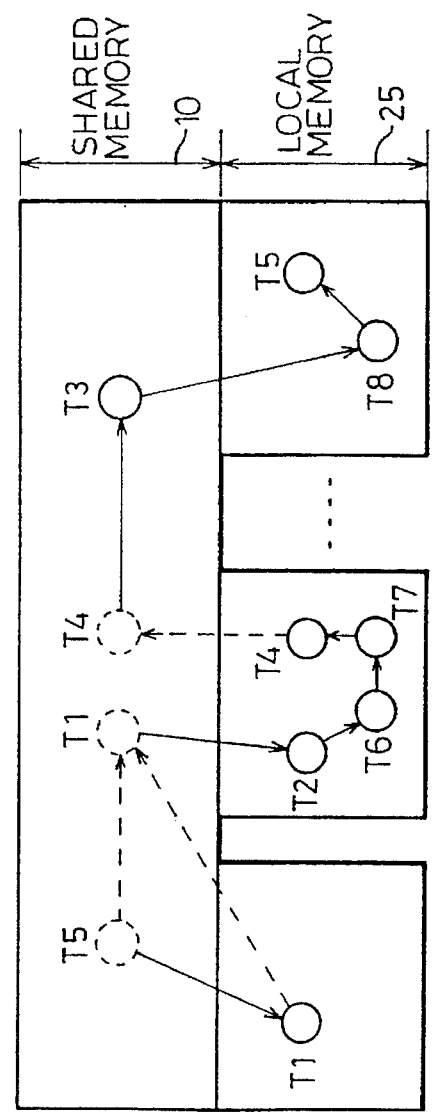

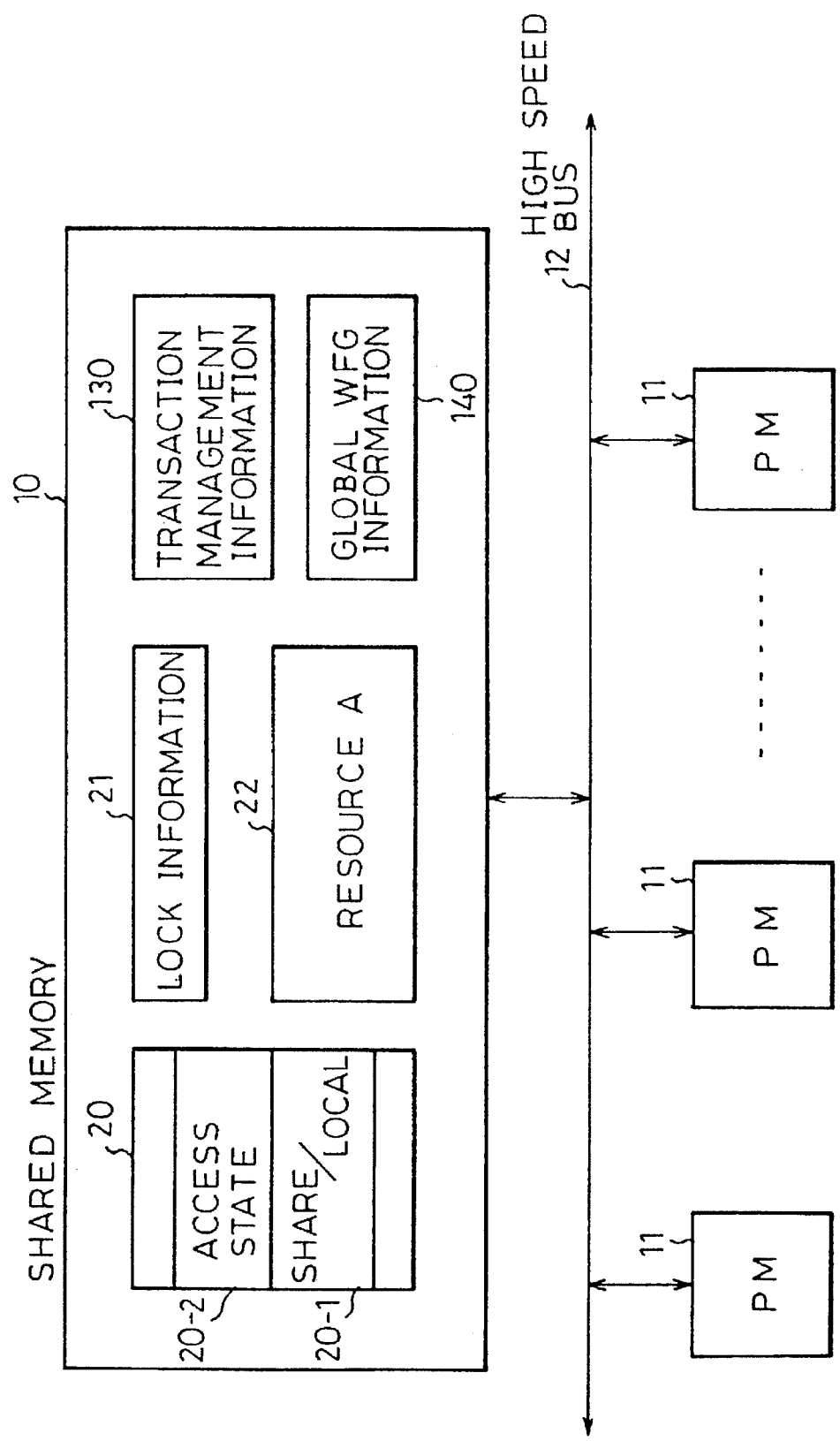

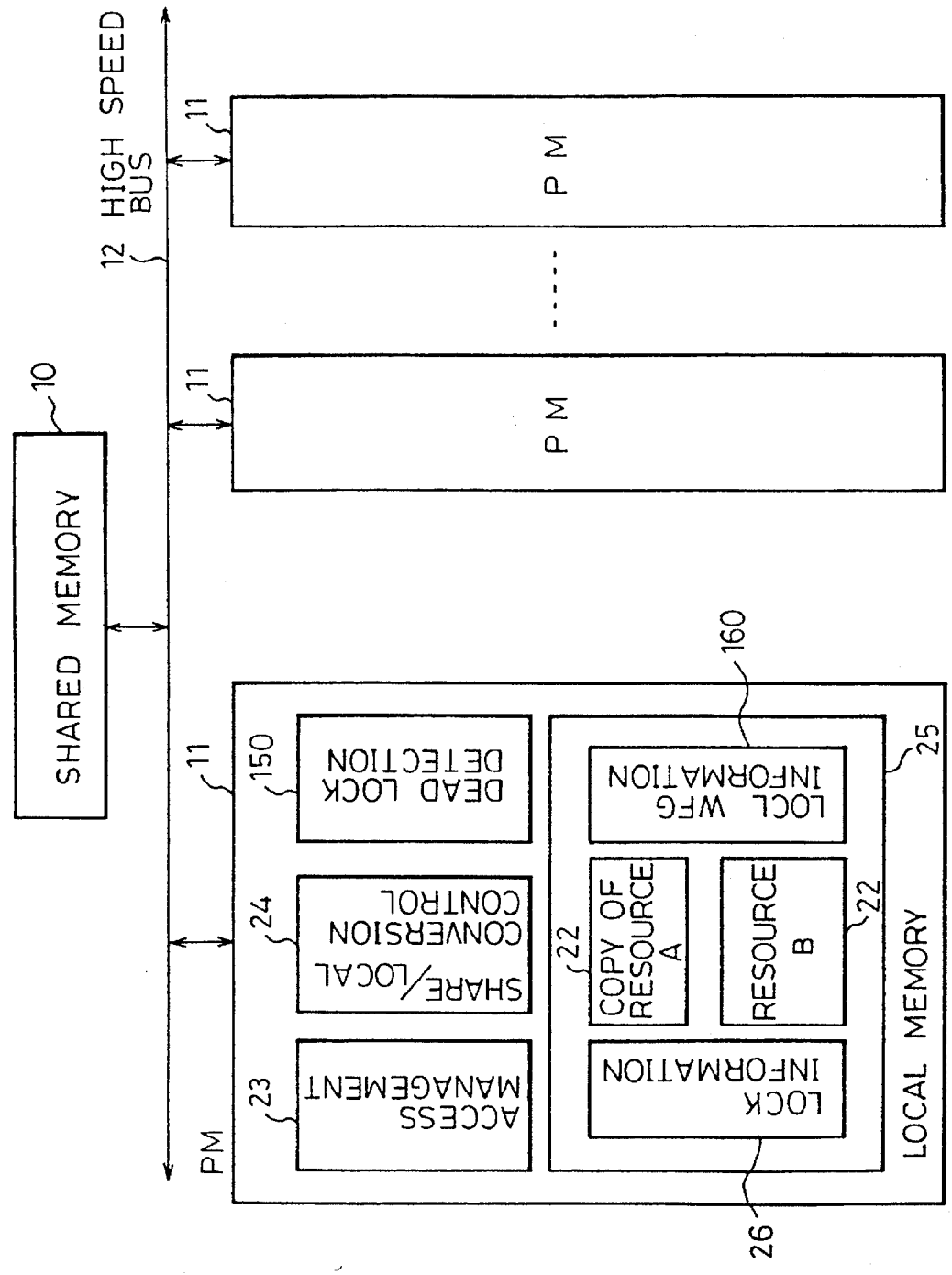

SYMMETRIC/ASYMMETRIC SHARED PROCESSING OPERATION IN A TIGHTLY COUPLED MULTIPROCESSOR

BACKGROUND OF THE INVENTION

1. Field of the Invention

The present invention relates to a data base processing system using a multiprocessor system, more particularly, it relates to a data base processing system enabling dynamic switching between a local processing operation and a shared processing operation in accordance with an access state to a resource. The resource is a unit of the data base to be processed. The local processing operation is an operation for locally processing the data mainly by using control data on a local memory, and the shared processing operation is an operation for processing the data mainly by using control data on a shared memory.

Another aspect of the present invention relates to a deadlock detection system enabling improvement of throughput of an entire data base processing system using the multiprocessor system.

2. Description of the Related Art

Multiprocessor systems can be roughly divided into a fine coupling type and a coarse coupling type. There are also various types of multiprocessor systems, for example, a complex type combining the above two types, and an intermediate type failling between the above two types.

In general, a data base processing system utilizes a multiprocessor system because the response is limited (limitation of throughput of the system) in a one processor system. While the data base is also managed by the multiprocessor System to raise the throughput of the system, it is necessary to ensure an "integrity guarantee" for maintaining the data base in a normal state. However, the necessary time for the integrity guarantee tends to considerably increase in the multiprocessor system because the integrity guarantee must be ensured in every processor. Accordingly, it is necessary to efficiently perform the integrity guarantee to increase throughput of the multiprocessor system. Further, it is necessary to efficiently perform the deadlock detection in the data base processing system.

SUMMARY OF THE INVENTION

An object of the present invention is to provide a data base processing system using a multiprocessor system for enabling efficient processing of the integrity guarantee.

Another object of the present invention is to provided an improved deadlock detection system for increasing the throughput of an entire data base processing system.

In accordance with the present invention, there is a data base processing system using a multiprocessor system comprising: a plurality of processor modules, each having a local memory and connected to each other by a high speed bus line; shared memory connected to the plurality of processor modules by the high speed bus line, the data base processing system including, a storage unit provided in the shared memory for storing data base management information representing either an object of a shared processing operation or an object of a local processing operation at every resource; an access management unit provided in each of the processor modules for performing access control for an access request to the data base under either the shared processing operation or the local processing operation in accordance with the data base management information, the shared processing operation being symmetrically performed, and the local processing operation being asymmetrically performed in each processor module; and a control unit provided in the processor module for controlling the shared/local conversion in such a way that: an access state of the resource is managed at every resource; when a frequency of the access is unevenly distributed to a special processor module, the resource of the special processor module is determined to be the object of the local processing operation for the special processor module; and when the frequency of the access is not unevenly distributed to a special processor module, the resource of the special processor module is determined to be the object of the shared processing operation.

Further, according to the present invention, the data base processing system further comprises a deadlock detection system including: a transaction management information area provided in the shared memory for managing transactions between the processor modules; a first directed graph information area provided in the shared memory for indication of waiting state between transactions operating different processor modules; a deadlock detection unit provided in the processor module for detecting deadlock; and a second directed graph information area provided in the local memory for indicating a waiting state between transactions operating within the processor module; wherein deadlock detection is separately performed between local deadlock detection and global deadlock detection in such a way that the waiting state of the transaction is searched in accordance with the first and second directed graph information on the shared memory and local memory.

BRIEF DESCRIPTION OF THE DRAWINGS

FIG. 14 is a schematic block diagram of a deadlock detection system according to the present invention;

FIGS. 15A and 15B are views for explaining the relationship between a local WFG and a global WFG;

FIG. 23 is a schematic block diagram of a shared memory for a data base processing system and a deadlock detection system shown in FIGS. 3 and 14; and FIG. 24 is a schematic block diagram of a processor module for a data base processing system and a deadlock detection system shown in FIGS. 3 and 14.

DESCRIPTION OF THE PREFERRED EMBODIMENTS

Before describing the preferred embodiments, an explanation will be given of a conventional data base processing system.

Figure 1:
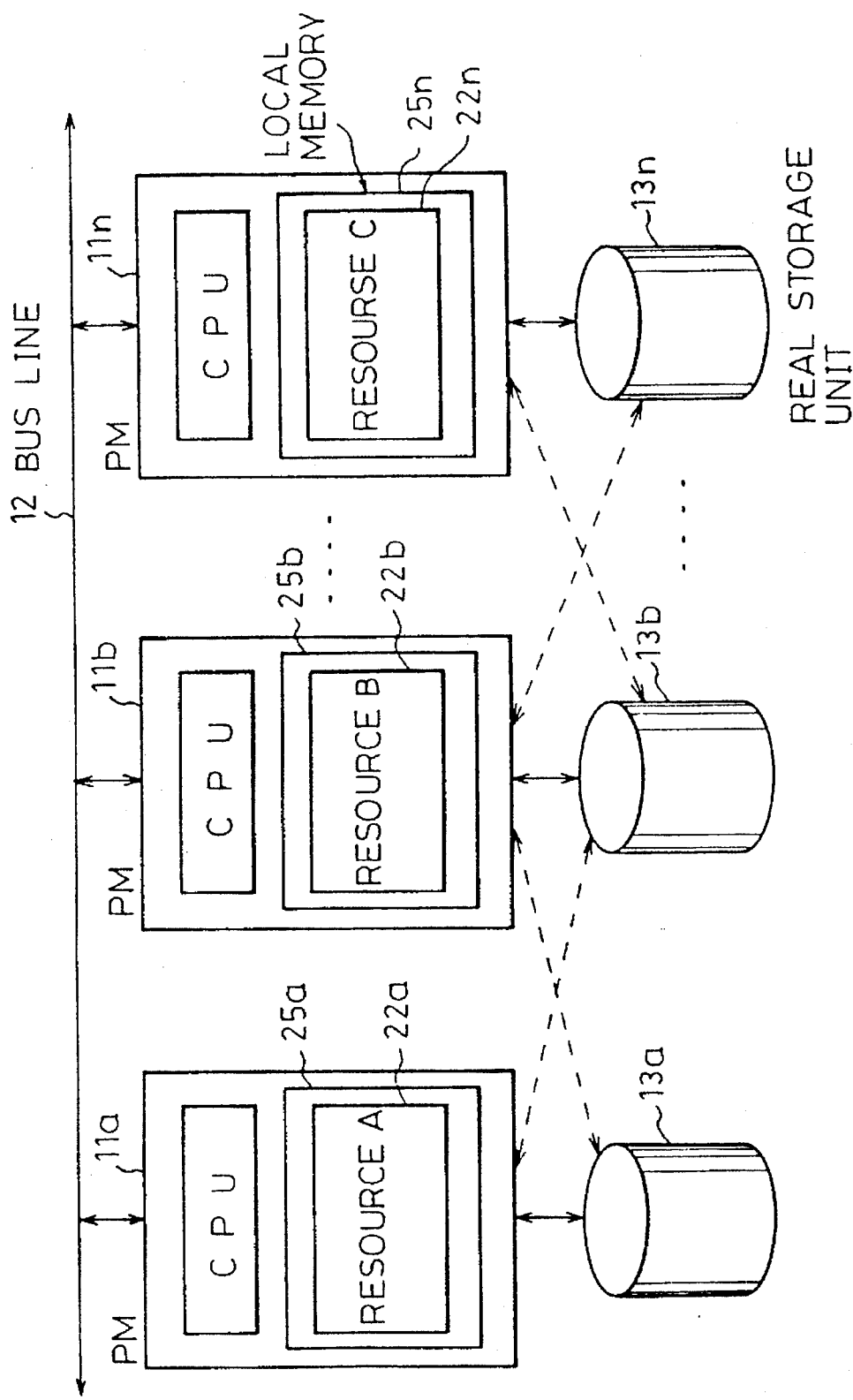
FIG. 1 is a block diagram of a conventional data base processing system using a multiprocessor system.
Figure 2:
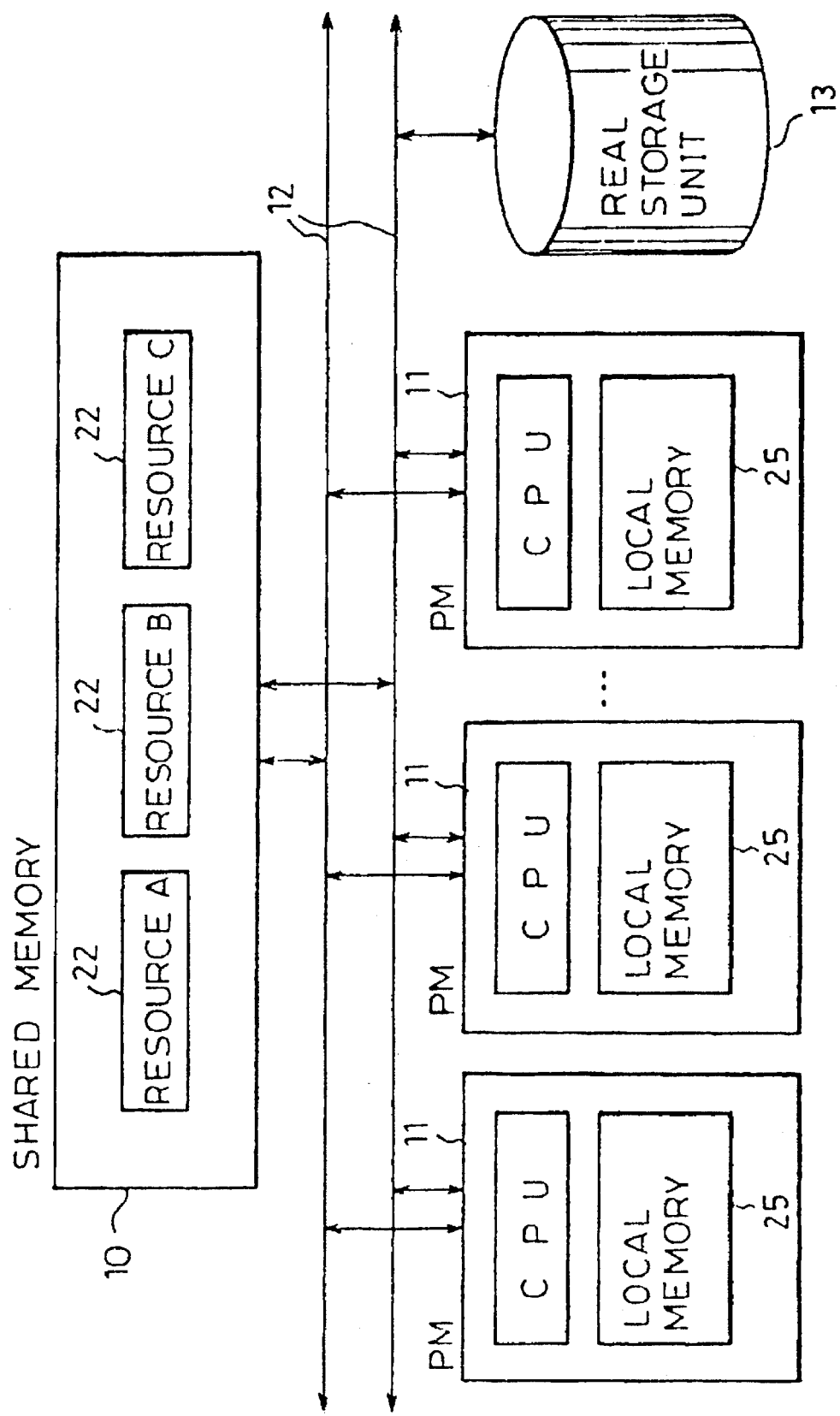
FIG. 2 is a block diagram of another conventional data base processing system using a multiprocessor system.

FIGS. 1 and 2 show an example of a conventional data processing system using a multiprocessor system.

In FIGS. 1 and 2, reference numbers 11a to 11n denote processor modules, each having a central processing unit (CPU) and local memory 25. Each processor module 11 is connected through a bus line 12 so that it is possible to communicate between processor modules. Reference numbers 22a to 22n denote a data base to be controlled. Each resource 22a to 22n is part of each processor module 11a to 11n. Further, reference numbers 13a to 13n denote real storage units for providing secondary data memory for each processor module.

In general, an access to the resource 22 is managed by so-called "granules", i.e., a unit of a given data set (a data set is an aggregation of data) existing in the data base. This unit may be indicated by, for example, a file level or a record level.

In the accessing resource 22, it is necessary to ensure the integrity guarantee to maintain the integrity of the data. The integrity of the data can be achieved, for example, by preventing contradiction of data caused by competition of access or by recovering from a fault.

In the system shown in FIG. 1, regarding the data stored in the real storage unit 13n, the resource 22n in each processor module 11n is previously and stationarily determined, or dynamically determined in accordance with load state. Accordingly, the integrity guarantee to the resource 22n is locally performed in each processor module 11n in the conventional art.

In the system shown in FIG. 2, reference number 10 denotes a shared memory having a plurality of resources 22. In this case, the resources 22 are read out from the real storage unit 13 and are stored in the shared memory 10. Shared memory 10 can be accessed from each processor module 11. In this case, the exclusive control and buffer control for the whole system are processed in common. That is, each processor module 11 symmetrically and commonly performs processing of exclusive control and buffer control in the whole system so that the high integrity guarantee can be realized in the shared processing operation of the whole system.

In the conventional art, the integrity guarantee is performed based on only two methods as explained above. That is, one integrity guarantee is only performed in the local processing operation in every processor module 11n as shown in FIG. 1, and the other integrity guarantee is only performed in the shared processing in the whole system as shown in FIG. 2.

Accordingly, in the conventional art, there is no such integrity guarantee for switching between the local processing operation and the shared processing operation in accordance with an access state of one resource.

That is, in the local processing operation in FIG. 1, for example, assuming that the processor module 11a accesses the resource B (22b), the processor module 11a generates a request to lock operation for exclusive control and a request for buffer access to the processor module 11b by utilizing the communication between processor modules through the bus 12. Accordingly, as a result, overhead (a rate of real time taken to run a management program compared to processor the overall operation time of a computer) for the between processor communication modules becomes very large. Particularly, throughput is considerably reduced in the special resource 22 which can be accessed by a plurality of processor modules. Further, it is difficult to perform a tuning operation (adjustment of a system to effectively assign resources in accordance with an amount of work and features of the work) because an operator must assign an optimal resource with reference to access data statistically obtained.

Further, in the shared processing operation in FIG. 2, even if one particular resource 22 is frequently accessed by a particular processor module 11, it is necessary to always perform management of the exclusive control and the buffer control in the whole system. Accordingly, efficiency of the throughput is considerably reduced in this method.

Accordingly, an object of the present invention is to effectively perform the integrity guarantee and to improve access performance.

A data base processing system using a multiprocessor system will be explained in detail hereinafter.

Figure 3:
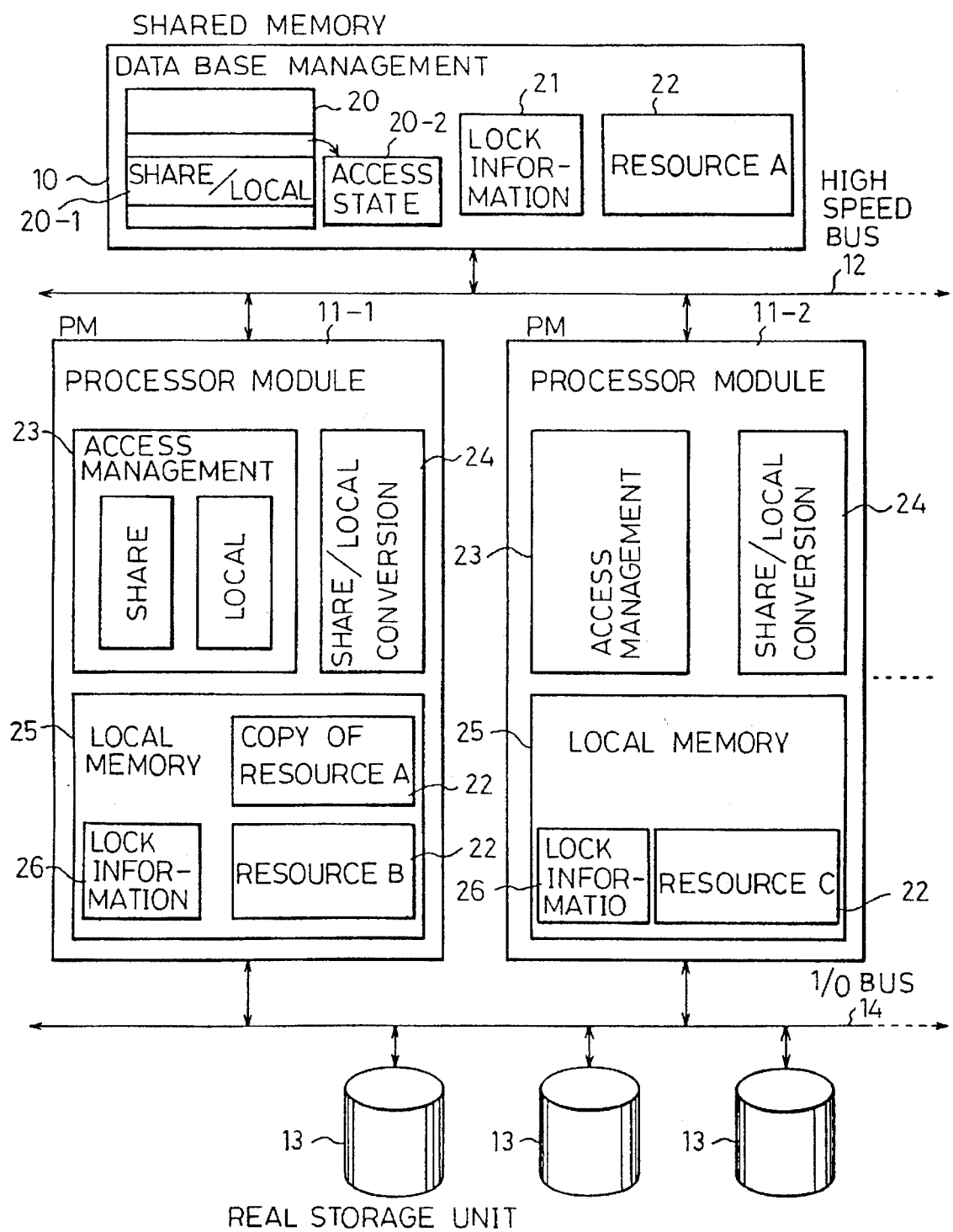
FIG. 3 is a schematic block diagram of a data base processing system according to the present invention.

FIG. 3 is a schematic block diagram of a data base processing system according to the present invention.

In FIG. 3, reference number 20 denotes a storage unit provided in the shared memory 10 for storing information for management of the data base, such as the access state 20-2 of the data base and shared/local processing operations 20-1. 21 denotes a storage unit also provided in the shared memory 10 for storing lock information for exclusive control of the data base. 23 denotes an access management unit provided in the processor module 11 to manage the access state of the resource. 24 denotes a conversion control unit for controlling the switching between the local processing operation and the shared processing operation. 26 denotes a storage unit provided in a local memory 25 of the processor module 11 for storing local lock information for exclusive control of the database.

Each processor module (11-1, 11-2, ...) having the local memory 25 is connected to the shared memory 10 through the high speed bus line 12. Further, in this system, each real storage unit 13 is connected to each processor module through an I/O bus line 14 so that it is possible for each processor module 11 to equally access any of the real storage units 13.

The management of the resource of the data base is performed based on the management information set in the data base management information storage unit 20. Although the storage unit 20 is provided in the shared memory 10 in this embodiment, it is possible to provide it in the local memory 25.

In the present invention, shared/local display area 20-1 indicates that the resource 22, which becomes the object of the access, is either the object of the shared processing operation or the object of the local processing operation. Further, an area 20-2 is also provided in the storage unit 20 for storing the access state of the resource.

Each processor module has the same structure, and comprises the access management unit 23 and the shared/local conversion control unit 24.

The access management unit 23 has a management function of both the resource 22 in the shared memory 10 and the resource in the local memory 25.

In the shared processing operation of the resource 22, each processor module 11 symmetrically performs the processing of the integrity guarantee for the resource 22. In this case, the word "symmetrically" means that the control is performed by the same processing sequence even if no processor module accesses the resource 22.

In the local processing operation, only the special processor module assigned to the resource 22 performs the processing of the integrity guarantee for that resource. Accordingly, the processing operation between the processor module managing the resource and the other processor module becomes "asymmetric".

The decision, whether the access control to the resource 22 is performed by either the shared processing operation or by the local processing operation, is performed with reference to the shared/local display unit 20-1 of the storage unit 20.

The shared/local conversion control unit 24 manages the access state for every resource 22. When the frequency of the access is unevenly distributed to one special processor module, the conversion control unit 24 determines that the resource is the object of the local processing operation for the special processor module. When the frequency of the access is not unevenly distributed to one special processor module, the conversion control unit 24 determines that the resource is the object of the shared processing operation. Accordingly, the conversion control unit 24 always supervises the access state of each resource 22 and performs the conversion control from the shared processing operation to the local processing operation and vice versa by updating the shared/local display unit 20.

Figure 4:
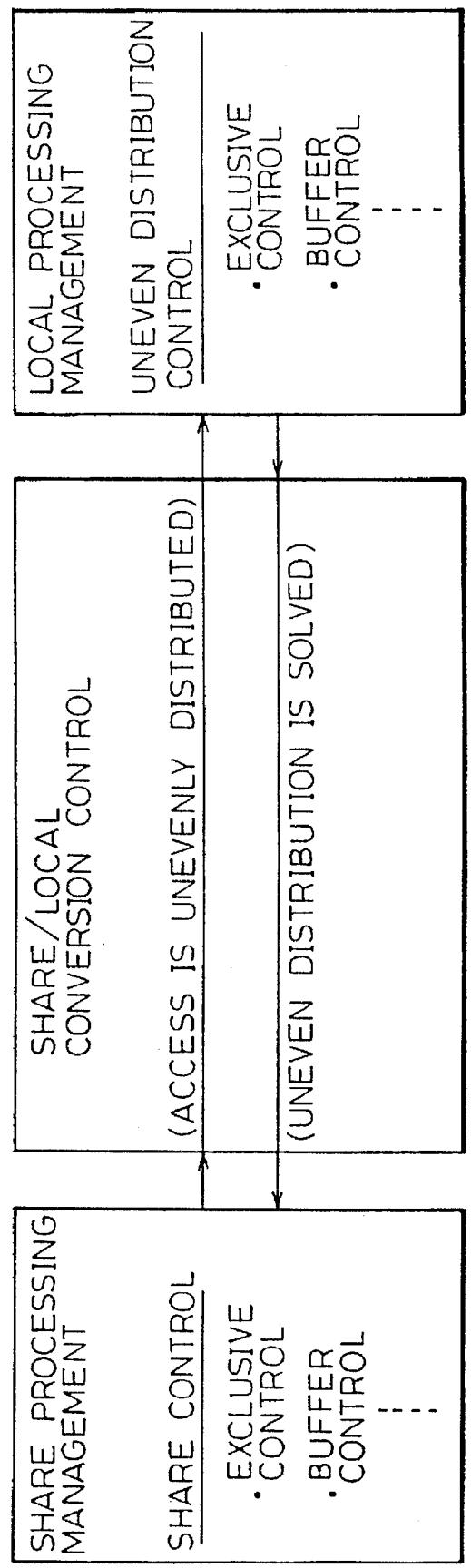
FIG. 4 is view for explaining an operation of the present invention.

FIG. 4 is a view for explaining an operation of the present invention.

The feature of the present invention lies in, in the management of the resource of the data base, dynamic switching between the local processing operation and the shared processing operation in accordance with the access state of the resource based on the shared/local conversion control. As explained above, the local processing operation is mainly performed in the local memory and the shared processing operation is mainly performed in the shared memory.

In the case of the local processing, the exclusive control and buffer control of the resource are performed by the special processor module managing that resource. When the access to the resource is unevenly distributed to the special processor module, it is possible to achieve high speed access control by locally performing the exclusive control and buffer control.

In case of the shared processing operation, the processing operation may be delayed in comparison to the local processing operation since the integrity guarantee is performed in the whole system. However, since the access operation is not unevenly distributed to the special processor module, it is possible to avoid a concentration of load on the special processor module when the resource is uniformly accessed by all processor modules.

As shown in FIG. 4, in the present invention, when the access operation is unevenly distributed to the special processor module, the local processing operation is performed. When the access operation is not unevenly distributed to the special processor module, the shared processing operation is performed. The above switching is dynamically performed by the shared/local conversion control unit. As a result, it is possible to perform optimal access management in accordance with the access state of the resource.

Figure 5:
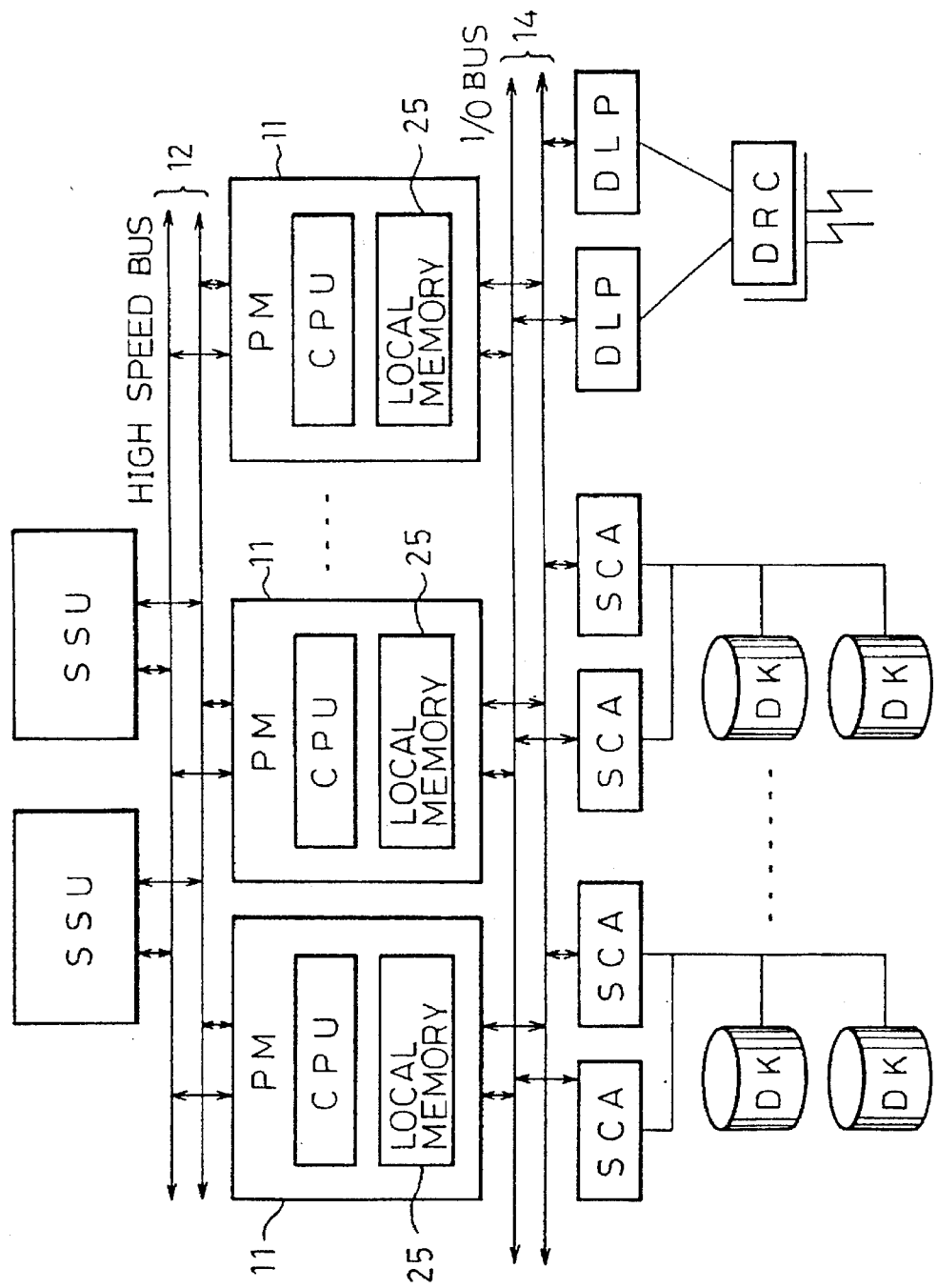
FIG. 5 is a schematic block diagram of a multiprocessor system applying the present invention.

FIG. 5 is a schematic block diagram of a multiprocessor system applying the present invention. In FIG. 5, SSU denotes a shared memory unit, SCA denotes an I/O interface adapter, DK denotes a disk unit, DLP denotes a data link processor, and DRC denotes a driver/receiver card. Further, 12 denotes a high speed bus, and 14 denotes an I/O bus. These bus lines are multiplexed to achieve high speed operation of the bus and to take countermeasures against faults.

As shown in FIG. 5 each processor module (PM) 11 has at least one CPU and local memory 25. The processor module 11 can access the shared memory unit SSU through the high speed bus 12 under control of a bus controller (not shown). Each processor module 11 is constituted so as to be able to perform the processing operation of other processor modules as needed. Accordingly, when a fault occurs in one processor module, that processor module is disconnected from the system and the processing operation is continued by another processor module.

The content of the data base is stored in the disk unit DK, for example, an optical disk device or a magnetic disk. The disk unit DK can be accessed by any processor module through the I/O bus 14 and the I/O interface adapter SCA.

Figure 6:
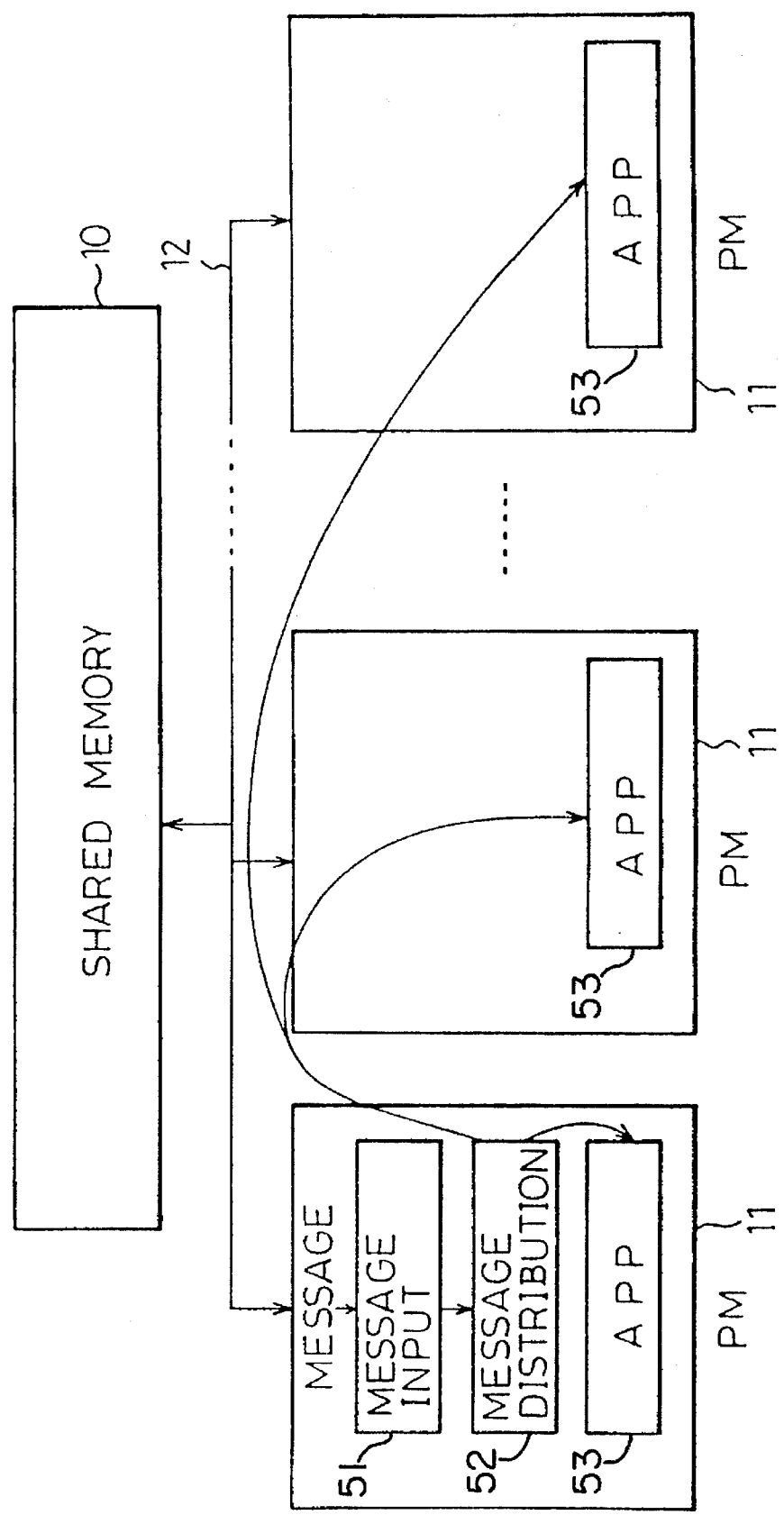
FIGS. 6 and 7 are views for explaining a processing operation of an access request from a terminal unit.
Figure 7:
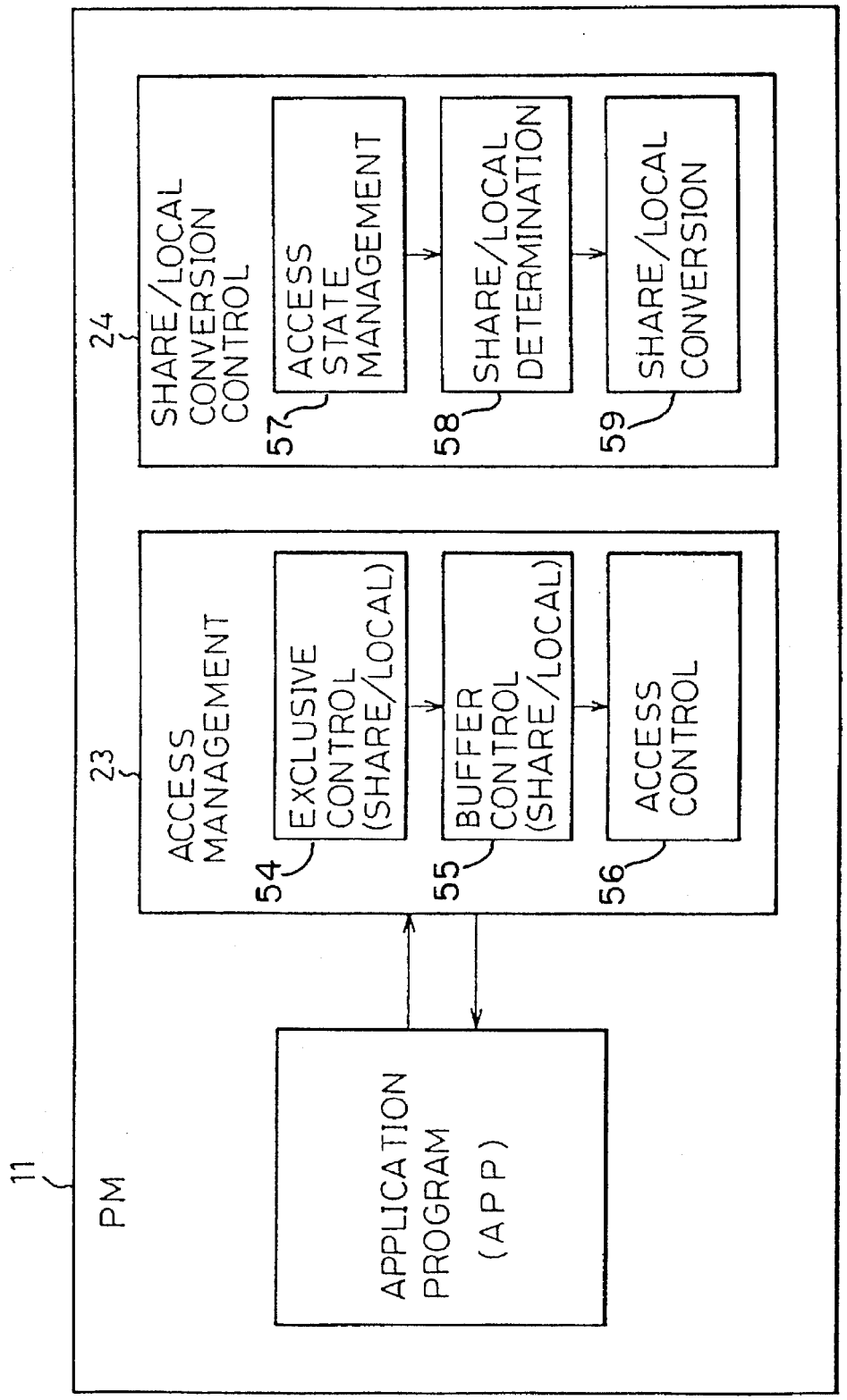

FIGS. 6 and 7 are views for explaining a processing operation of an access request from a terminal unit. FIG. 6 is a flowchart of the processing operation from an input of a message until start of an application program. In FIG. 6, APP denotes the application program. FIG. 7 is a flowchart of the processing operation at the data base management unit. Reference numbers 51 to 59 in these drawings correspond to the following item numbers.

At 51 a message, for example, a data base search request, is input from the terminal unit to the processor module 11. The processor module 11 performs a given processing operation in response to the message. In this case, the terminal unit may previously determine the special processor module carrying the special message.

At 52 the message is distributed to each application program APP of each processor module 11 in accordance with the load state at each processor module and the content of the data base to be accessed by the application program.

At 53 the application program APP, to which the message is distributed, starts to execute. The application program APP can perform the access request to the data base management unit based on a data base operation language if necessary.

At 54 in the data base management unit, the access management unit 23 performs the exclusive control for the resource receiving the access request, i.e., the lock control to avoid the competition for access, in accordance with the interface of the application program. This exclusive control is selectively performed in accordance with whether the resource to be accessed becomes the object of the shared processing operation or the object of the local processing operation. Accordingly, the effective lock management is selectively performed either in the whole system or only the special processor module.

At 55, 56 the shared memory and the local memory are, for example, selectively utilized in accordance with whether the resource to be accessed becomes the object of the shared processing operation or the object of the local processing operation. The buffer control is performed after the above selection between the object of the shared processing operation and the object of the local processing operation. The result of the access is informed to the application program APP receiving the access request.

At 57 besides the above access processing, the shared/local conversion control unit 24 manages and maintains the access state at each processor module. The shared/local conversion control unit 24 also collects information to judge whether to each resource is the object of the shared processing operation or the object of the local processing operation.

At 58 the shared/local conversion control unit 24 investigates the frequency of the access for each resource. That is, the unit 24 investigates whether or not the frequency of the access is concentrated on a particular processor module. The unit 24 determines whether the management of the shared processing operation or the management of the local processing operation should be done.

At 59 when a conversion between the shared and the local processing operation is necessary, the conversion processing operation is performed in the shared/local conversion control unit 24 to convert from the shared processing operation to the local processing operation, or vice versa. This conversion is performed in such a way that the management information and the resource are moved between the shared memory and the local memory. The shared/local conversion control unit 24 periodically performs the above conversion in accordance with a predetermined interval or at a suitable timing.

Figure 8:
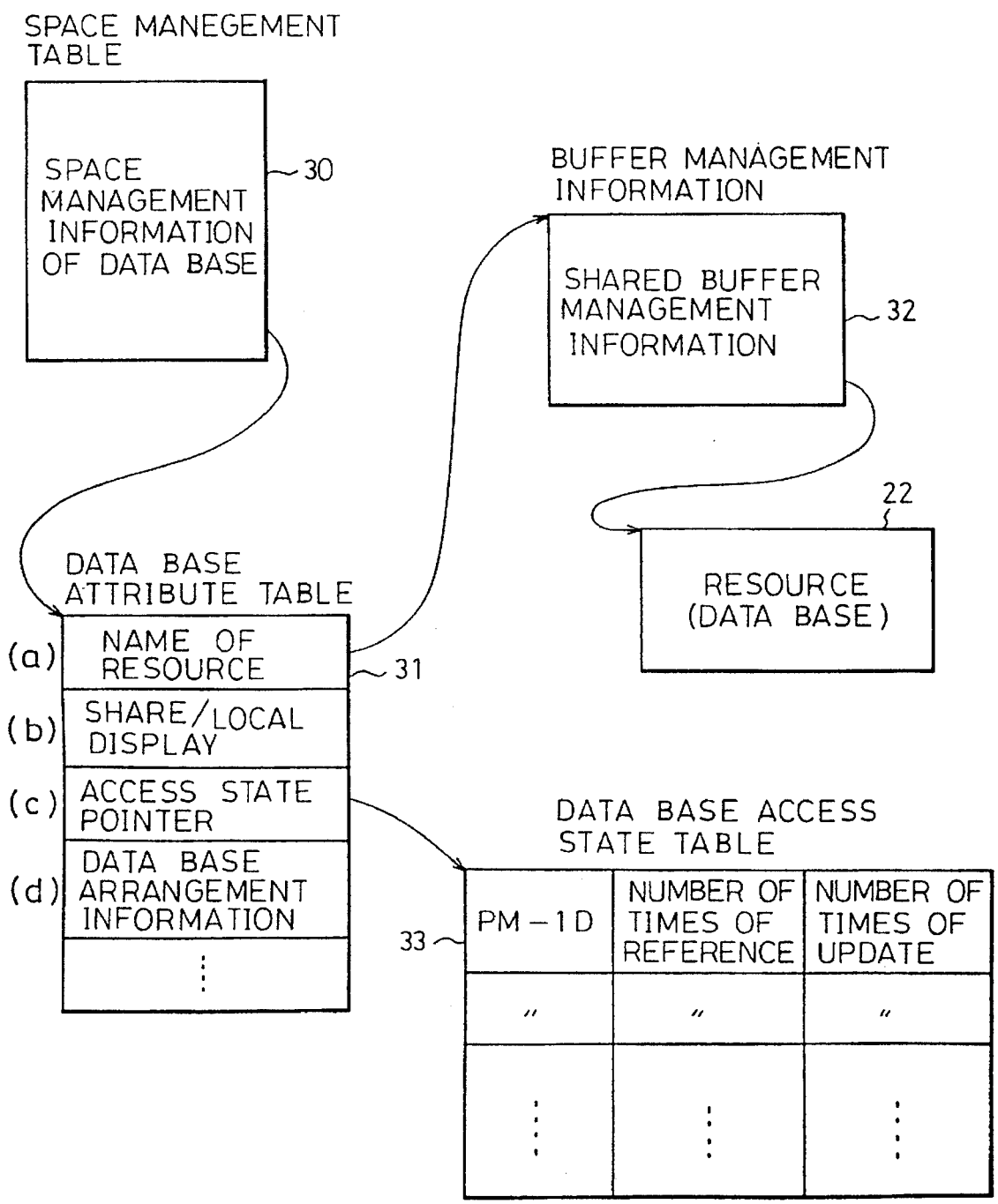
FIG. 8 is a view for explaining management data to be used in the shared and local processing operations according to the present invention.

FIG. 8 is a view for explaining management data to be used in the shared and local processing operations according to the present invention. In FIG. 8, reference number 30 denotes a space management table for storing space management information for management of the data base. Reference number 31 denotes a data base attribute table for storing various information regarding the resource. Reference number 33 denotes a data base access state table for storing the access state of every processor module.

In this embodiment, the processor module can comprise a plurality of address spaces, and the management of the data base and the address space is performed by a kernel operating system (OS) to manage resources, service, etc.) provided in common to each address space. Further, the processor module has a back-up function used when a space fault accidentally occurs. The space management table 30 further comprises a pointer function for pointing to the data base attribute table 31.

The data base attribute table 31 has the following information for every resource:

(a) Resource name: This name is added to a unit managing shared/local memory at every resource. The actual resource 22 can be discriminated by this resource name. That is, it is possible to correspond the data of the shared buffer with the data of the local memory through the buffer management information 32.

(b) shared/local display: This display is performed by a flag indicating that the corresponding resource 22 is controlled either by the shared processing operation or by the local processing operation. The memory containing the resource and its management information, i.e., either the shared memory or the local memory is determined in accordance with this display.

(c) Access state pointer: The access pointer is used for pointing to the data base access state table 33.

(d) Data base arrangement information: This information has an identifier (ID) for the processor module to ensure the integrity of the data in case of the local processing operation.

The data base-access table 33 has the following information used to manage the access state at every resource. This information includes the number of access times from each processor module.

(a) PM-ID denotes the identifier of the processor module directly accessing the resource or indirectly accessing, under the access request, the resource.

(b) Number of reference times and number of update times denotes the number of times every processor module is accessed.

The data base attribute table 31 and the data base access state table 33 are provided in the shared memory and local memory as follows.

When the resource belongs to the local processing type, the data base attribute table 31 and the data base access state table 33 are provided in the local memory of the processor module which performs the local processing control.

When the resource belongs to the shared processing type, the data base attribute table 31 is provided in the shared memory. However, the data base access state table 33 is provided in both the shared memory and the local memory. In this case, the processor module updates only access state information for its own processor module.

The access state data from each processor module is collected in the shared memory at predetermined time intervals.

Figure 9:
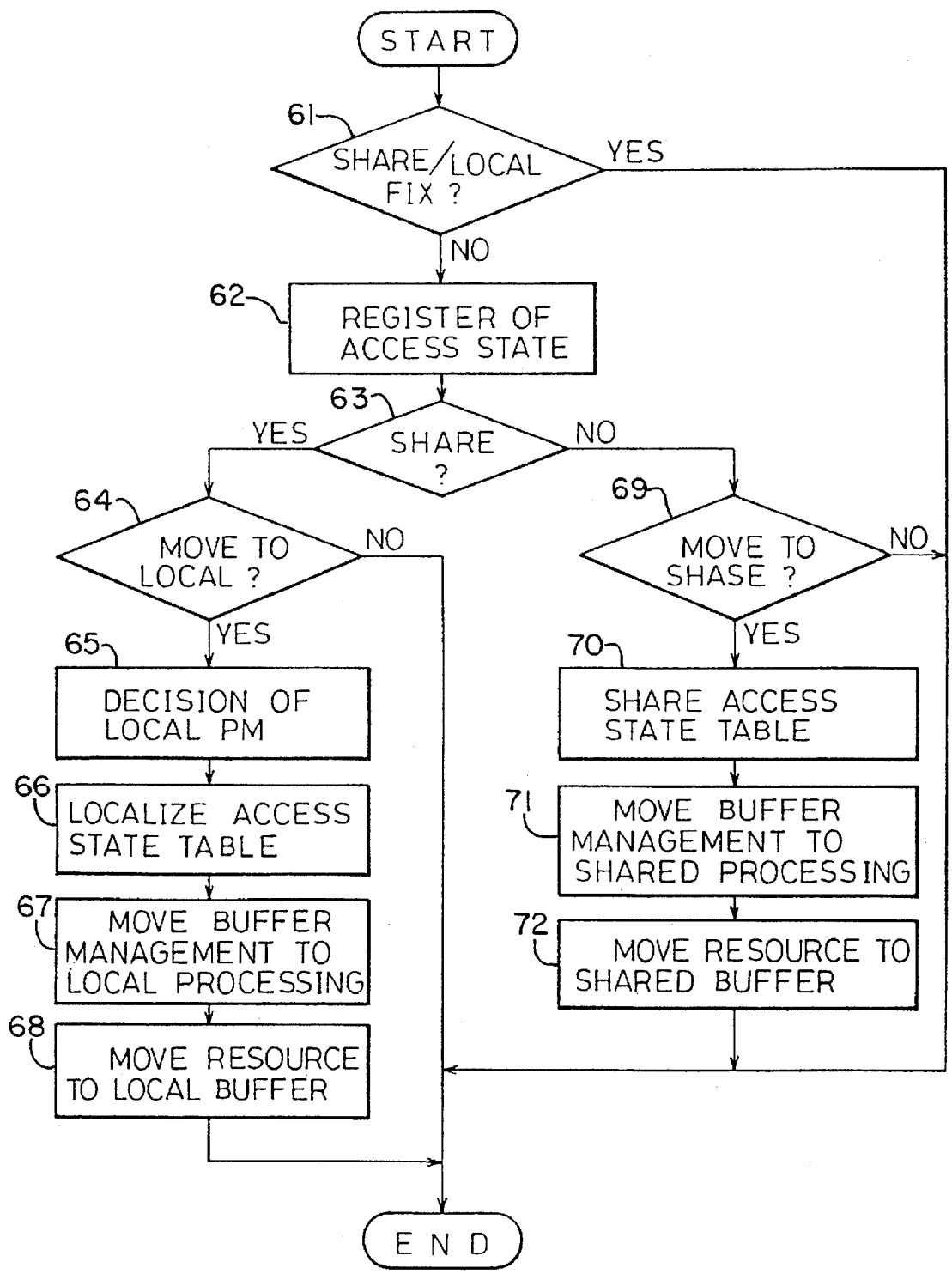
FIG. 9 is a flowchart of share/local conversion control according to the present invention.

FIG. 9 is a flowchart for explaining shared/local conversion control according to the present invention.

At 61 the judgement is performed as to whether the resource is fixed to the shared processing type or the local processing type. Regardless of the access state, when the operator or the system manager fixedly designates one of the above types for the resource, the conversion control between the shared processing and the local processing is not performed.

At 62 the access state at every processor module is collected and registered in the data base access state table in the shared memory.

At 63 the judgement is performed based on the data base attribute table as to whether the current resource belongs to the shared processing operation or the local processing operation. When the resource belongs to the shared processing operation, the next step 65 is selected (YES). When the resource belongs to the local processing operation, the step 69 is selected (NO).

In step 64 the judgement is performed as to whether or not the processing should be moved to the local processing operation. In this case, the access state is investigated as to whether the number of access times at one processor module is considerably larger than that of the other processor module with reference to the result of the access state. When the access is not unevenly distributed to a particular processor module (NO), the processing of the resource is completed.

In step 65 when the processing is moved to the local processing operation in step 64 (YES), the local processor module PM is determined in such a way that the processor module, which ensures the integrity of the resource determined as the local processing type, is recognized as the processor module to which access is considerably large.

In step 66, data base access state table is cleared in this step. The management information is moved to the processor module performing the integrity guarantee hereinafter. That is, data base access state table is used for the local processing operation.

In step 67 the buffer control is moved to the local processing management. The management of the newest data base is performed by the processor module determined as the local processing type.

In step 68 the data base buffer of the resource is moved to the buffer provided in the local memory of the processor module performing the local processing operation to improve the access efficiency of the data base.

In step 69 when the resource is not the shared processing type, that is, when the resource is the local processing type, the processor module performing the local processing operation registers the access state in accordance with the access request from each processor module. When the number of access times of the processor module performing the local processing operation is smaller than that of the access to the other processor module, that resource is determined as the shared processing type and steps 70 to 72 are performed as explained below. In this case, when the locality is incorrect, the operation is moved to other local PM. This step is also added to step 64.

In step 70 the data base access state table is cleared in this step. The management information is moved from the local memory of the processor module performing the integrity guarantee hereinafter to the shared memory. That is, the buffer control is moved to the shared processing management.

In step 71 the management of the newest data is also performed by the shared processing management. That is, the resource is symmetrically managed by each processor module.

In step 72 the data base buffer for the resource is moved to the shared memory so that it is possible to improve the efficiency of accessing reference from the other processor modules.

As explained above, according to the present invention, either the integrity guarantee for the shared processing operation or the integrity guarantee for the local processing operation can be automatically selected in accordance with the access state for the resource of the data base. Accordingly, it is possible to achieve high speed access control between the processor modules. Further, it is possible to achieve reduction of the overhead in the communication between the processor modules so that it is possible to raise the throughput of the whole system.

Another aspect of the present invention relates to a deadlock detection system in the data base processing system using the multiprocessor system shown in FIGS. 3 and 4.

Before describing an embodiment of the deadlock detection system according to the present invention, an explanation will be given of a basic deadlock detection method.

Figure 10:
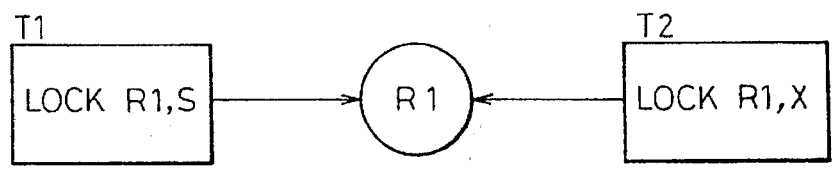
FIGS. 10 to 12 are views for explaining a deadlock state of an exclusive control under a lock control.
Figure 11:
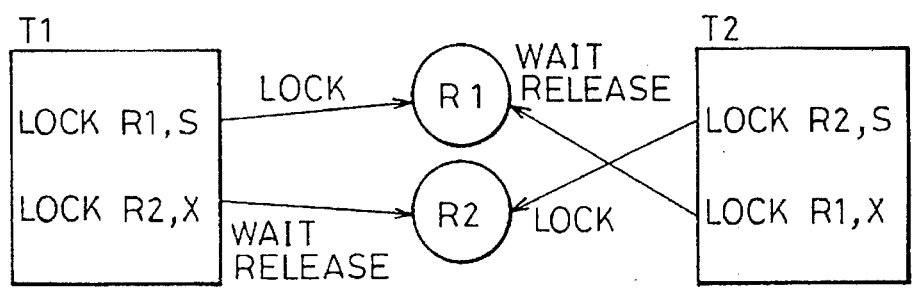
Figure 12:
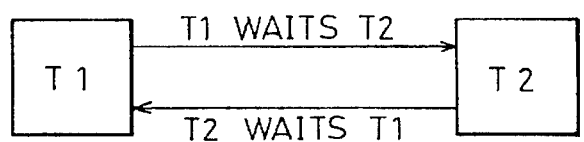
Figure 13:
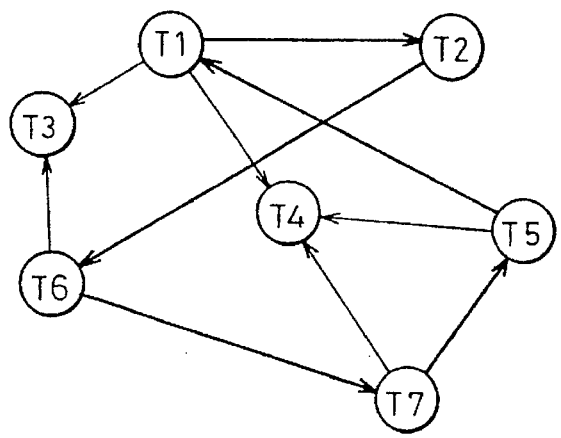
FIG. 13 is a view for explaining one example of a wait for graph ("WFG")

FIGS. 10 to 12 are views for explaining a deadlock state in the exclusive control under the lock control, and FIG. 13 is a view for explaining one example of a wait for graph WFG. In the lock control, the order of the reference and the order of updating the special resource between the request sources needing the same resource is defined by designating the mode of the lock (a shared mode or an exclusive mode) for the resource and the name of the resource. As a result of the determination of the processing order, the integrity of the resource can be easily ensured.

In FIG. 10, T1 and T2 denote transactions, and R1 and R2 (FIG 11) denote resources. The transaction is a unit of sequential data or a request for processing of data input from a terminal. This drawing shows the state in which first, the transaction T1 performs the lock control of the resource R1 under the shared mode S, and second, the transaction T2 requests the lock control under the exclusive mode X. In this case, the lock control request from the transaction T2 is delayed until the transaction T1 releases the lock control. When performing the exclusive control under the lock control, a deadlock occurring in this exclusive control is a problem to be solved. The deadlock state occurs when two request sources are simultaneously requesting lock control of the special resource and both are waiting for the order of the lock control between two request sources.

In FIG. 11, for example, the transaction T1 performs the lock control of the resource R1 in the shared mode and waits for the release of the lock of the resource R2 in the exclusive mode. The transaction T2 simultaneously performs the lock control of the resource R2 in the shared mode and waits for the release of the lock of the resource R1 in the exclusive mode. In this case, as shown in FIG. 12, as a result, the transaction T1 waits for the transaction T2, and the transaction T2 waits for the transaction T1. Accordingly, the deadlock state occurs between the two transactions T1 and T2 because neither processing operation at T1 and T2 can be completed.

In general, a directed graph is used in deadlock detection. The directed graph represents the waiting state between transactions under the lock control. The deadlock detection is performed by detecting a closed loop in the directed graph. In general, the directed graph is called a WFG (Wait For Graph).

FIG. 13 is a view for explaining one example of a WFG. In FIG. 13, T1 to T7 denote transactions. Each arrow line between transactions denotes a waiting state. As shown by thick arrow lines, the lines T1→T2→T6→T7→T5→T1 constitute one closed loop. That is, T1 waits for T2, T2 waits for T6, T6 waits for T7, T7 waits for T5, and T5 waits for T1. Accordingly, the deadlock state occurs in this closed loop. The deadlock state can be released by cutting the loop in such a way that any one of the requests is processed as an error in the transaction.

In multiprocessor systems, there are three known methods of the deadlock detection utilizing the WFG as shown by the following items (a) to (c).

(a) In the multiprocessor system, first, a special processor module is provided to perform deadlock detection. That processor module uses WFG analysis to perform the deadlock detection for the whole system.

(b) All WFG's are recorded in the shared memory. Each processor module symmetrically performs the deadlock detection by utilizing the WFG's in of the shared memory.

(c) Each processor module independently performs the deadlock detection by utilizing its local memory. Each processor module has a local WFG and a global WFG. The message communication through the bus is performed between the processor modules when the local WFG of another processor module is needed for the deadlock detection.

However, problems occur in the above three conventional methods as explained below.

In item (a), first, the special processor module carries a heavy load since such a special processor module mainly controls the deadlock detection. Second, the cost for maintaining the whole WFG is large. Third, when a fault occurs in the special processor module, the influence of the fault affects the whole system.

In item (b), in this method, it is necessary to always access the shared memory even if the deadlock can be dealt with within the processor module. Accordingly, the processing speed is considerably delayed so that the throughput of the system is reduced.

In item (c), the overhead of the message communication between the processor modules is considerably increased since each processor module manages the WFG in the local memory.

A deadlock detection system according to the present invention is explained in detail below.

FIG. 14 is a schematic block diagram of a deadlock detection system according to the present invention. This drawing corresponds to FIG. 3. Accordingly, the shared memory 10 and the processor module 11 are the same as shown in FIG. 3, but the deadlock detection function is added to the shared memory 10 and the processor module 11 as shown in FIGS. 23 and 24.

In FIG. 14, the shared memory 10 includes the transaction management information area 130 for managing the transaction, and the global WFG information area 140 for indicating the waiting state of the transaction between the processor modules. The processor module 11 comprises a deadlock detection unit 150, and the local memory 25 includes the local WFG information area 160.

In the present invention, the deadlock is detected by utilizing the directed graph indicating the wait state between the transactions. Accordingly, the local WFG, i.e., the directed graph information indicating the wait state between the transactions operating within the associated processor module, is set in the local memory. An agent information of another system, which indicates that the transaction of another system is waiting waits for its own transaction, is set in the shared memory as the directed graph information for indicating the wait state between the transactions operating across different processor modules.

As explained above, since the local WFG is provided in the local memory and global WFG's are provided in the shared memory, it is possible to separate a local deadlock detection and a global deadlock detection.

The deadlock detection unit 150 detects the waiting state in accordance with the directed graph information in the shared memory 10 and the local memory 25. When a closed loop is detected, the deadlock detection unit 150 recognizes the occurrence of the deadlock and starts to perform the process for releasing the deadlock.

When applying the deadlock detection method using the WFG to a multiprocessor system, in a conventional method, either all WFG information is provided in the shared memory 10, or all WFG information is provided in the local memory of the special processor module performing the deadlock detection. In the present invention, as shown in FIGS. 14 and 15, the global WFG information 140 and the local WFG information 160 are separately managed.

FIG. 15A is a view for explaining the relationship between the local WFG and the global WFG. In FIG. 15A, a transaction indicating a waiting state between other transactions within the same processor module is managed in each processor module based on the following:

(a) transaction T1.

(b) transactions T2, T4, T6 and T7.

(c) transactions T3, T5 and T8.

A transaction indicating a waiting state for another transaction operating across different processor modules is constituted as the transaction agent, and is shown as follows:

(d) transactions agent of T1, T4 and T5.

In FIGS. 15A and 15B, the T5 (dotted circle) waits for the T1 and the T5 has only identification of the T1 (dotted circle). Further, the T1 waits for the T2, and the T4 waits for the T3.

The structure of the WFG has the agent information in the shared memory in the case of the shared/local processing.

As a modification, it is possible to have the relationship between the transactions lock the resource corresponding to the shared processing.

FIG. 15B shows $T_3$ and $T_4$ for the lock operation to the resource of the shared processing. As shown in FIGS. 15A and 15B, when the lock processing is operated in each system, the agent is provided in the shared memory when the lock is requested from another processor module. However, in the case of the lock operation to the shared processing shown in FIG. 15B, it is necessary to perform the message communication when preparing the WFG. In this case, the message communication is not affected by the performance of the transaction since the WFG is asynchronously provided.

The deadlock detection is performed for the T1 on the shared memory after the local deadlock detection is performed on the T2.

The waiting state of T1 waiting for the T2 can be judged since the agent of the T2 exists in the shared memory and it can discriminate on the shared memory.

As explained above, the local WFG is only used within the processor module corresponding to the local memory 25, and the global WFG used between the processor modules is provided in the shared memory 10. Accordingly, it is possible to solve a drawback of the conventional art as explained below.

(1) It is possible to detect the deadlock only within one processor module in the case of a locally closed deadlock. For example, it is possible to clarify whether or not the deadlock state occurs among transactions T1, T2, and T3, with reference to the local memory if only a single processor module is dealing with those transactions.

(2) In the deadlock detection between the processor modules, it is possible to select one of following two methods in accordance with the system structure. That is, in one method, each processor module completely and independently performs deadlock detection with reference to the information in the shared memory 10. In the other method, each processor module cooperatively performs deadlock detection with reference to shared information in the shared memory 10.

(3) In the global deadlock detection between the processor modules, it is possible to facilitate the adjustment of the frequency of the deadlock detection. For example, the deadlock detection may be omitted taking into consideration the load on the system, and transactions over a predetermined defined time may be stopped.

Figure 16:
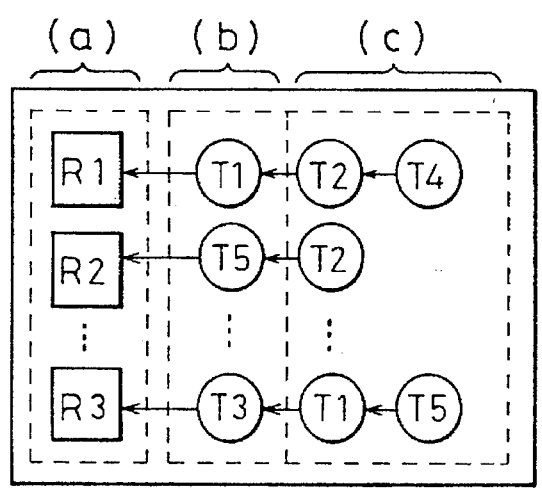
FIG. 16 is a view for explaining resource management information.

FIG. 16 is a view for explaining resource management information. In this drawing, the (a) portion denotes management information of the resources R1, R2, R3 which become the object of the lock control, and (b) and (c) portions denote the management information of the waiting state. In this case, each of the (b) transactions maintains the lock state of the corresponding resource. Further, each of the (c) transactions maintains the waiting state for the release of the transaction.

In this example, the transaction T1 maintains the lock of the resource R1, and the transaction T2 waits for the release of the lock of the resource R1 from the transaction R1. The transaction T4 also waits for the transaction T2.

Figure 17:
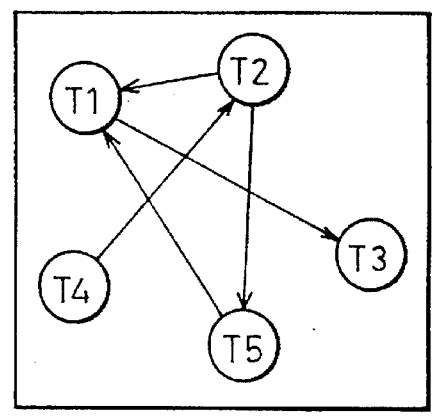
FIG. 17 is a directed graph indicating resource management information shown in FIG. 16.

FIG. 17 is a directed graph indicating the waiting state of the resource management information shown in FIG. 16. As explained in FIG. 12, for example, the right direction arrow indicates that T2 waits for T1. In the case, the WFG information is expressed by a table and a link information (identification information).

FIGS. 18 to 20B are views for explaining the configuration of deadlock detection according to the present invention.

Figure 18:
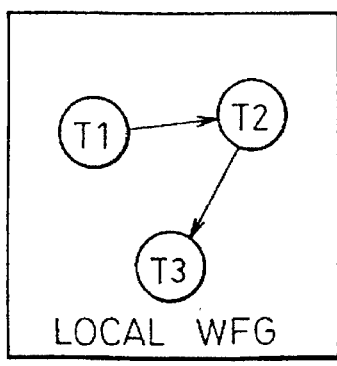
FIGS. 18 to 20B are views for explaining the configuration of the deadlock detection according to the present invention.

In FIG. 18, when the related WFG exists in the local memory as local WFG information 160, the processor module having that local memory independently performs the deadlock detection with reference to only that local WFG information.

Figure 19:
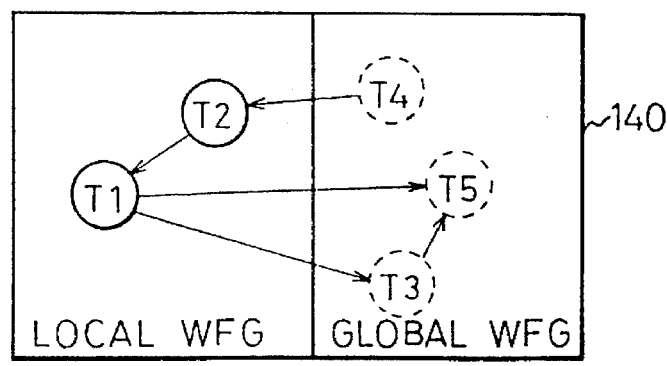

In FIG. 19, when related WFG information exists in the local WFG 160 and the global WFG 140, the deadlock detection is performed in steps of: first, investigating the loop of the graph based on the local WFG information; second, accessing the shared memory 10 when the waiting state for the agent exists; and, finally referring to the global WFG information.

Figure 20A:
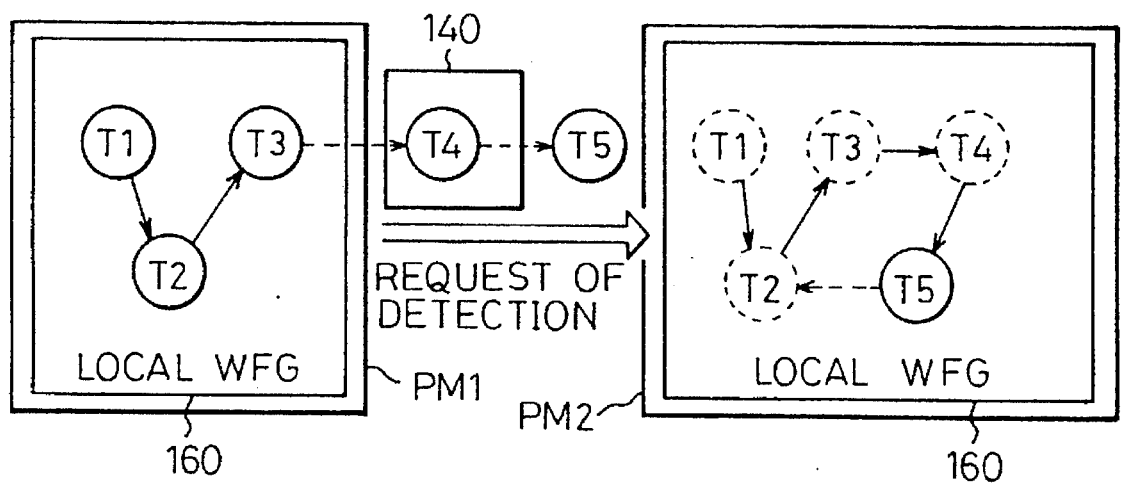

In FIG. 20A, when the waiting state exists between the local WFG information 160 stored in the local memory of the processor module PM1 and the local WFG information 160 of the other processor module PM2 through the global WFG information 140, it is impossible to detect the deadlock by only using the processor module PM1.

Accordingly, in this case, the processor module PM1 sends a subgraph of its own local WFG information to the processor module PM2 through the message communication, and requests the detection of the deadlock to the processor module PM2. Accordingly, the processor module PM2 can detect the occurrence of the deadlock based on the subgraph and its own local WFG information.

Figure 20B:
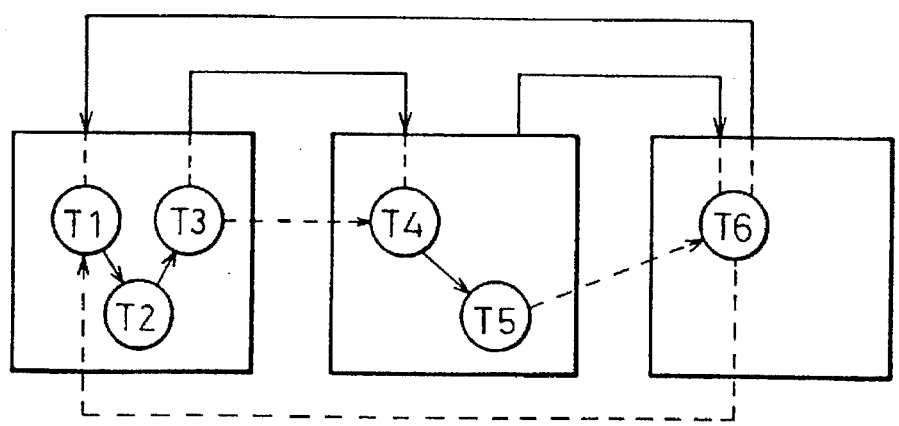

Further, it is possible to register the subgraph of the local memory to the shared memory and to detect the loop between the systems as shown in FIG. 20B.

Figure 21:
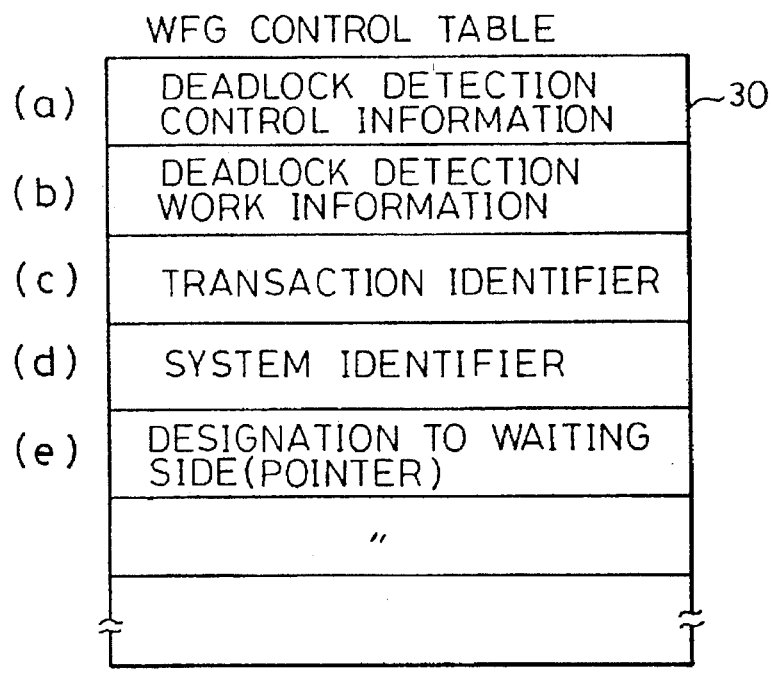
FIG. 21 is a WFG control table provided for every transaction having a waiting state.

FIG. 21 is a WFG control table provided for every transaction having a waiting state. The WFG control table 30 comprises the following areas (a) to (e).

(a) Area for the deadlock detection control information:

The information for selecting the transaction subject to release of the deadlock is set in this area.

(b) Area for the deadlock detection work information:

This area is temporarily used during the detection of the deadlock.

(c) Area for setting the transaction identifier:

The identifier of the transaction having the waiting state is stored in this area.

(d) Area for setting the system identifier:

The identifier of the processor module which is operating on the transaction, or the identifier of the subsystem managing the data base being operated on by the processor module is set in this area.

(e) Area for the pointer to designate to the waiting side.

The pointer designating the transaction having a waiting state, to the WFG control table is stored in this area. When there are a plurality of waiting states, a plurality of areas are prepared in this table.

Figure 22:
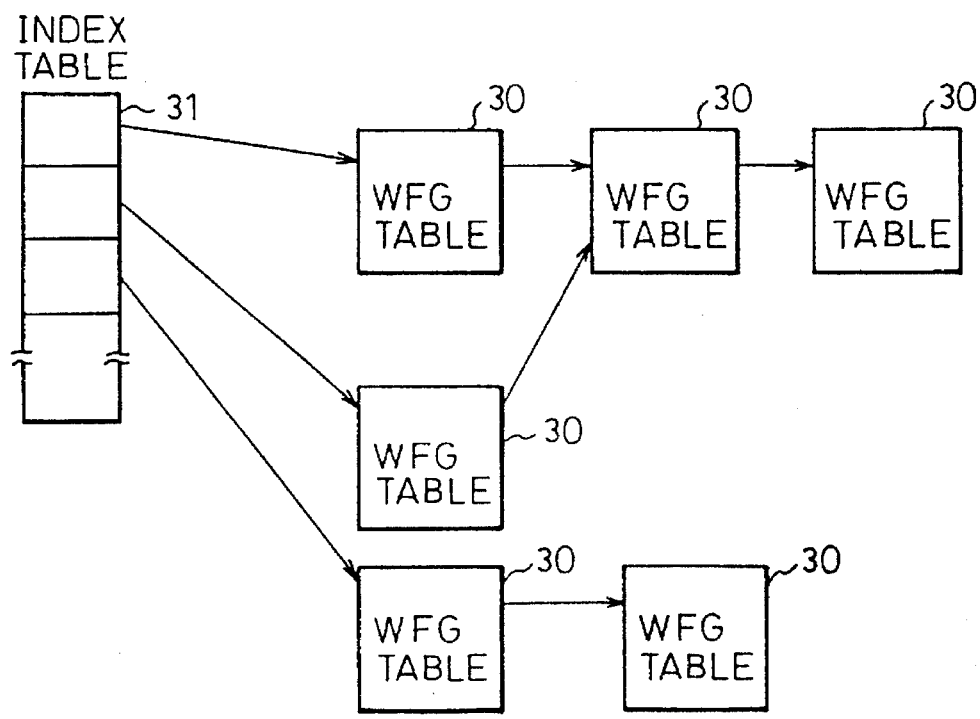
FIG. 22 is a view for explaining a WFG control table shown in FIG. 21.

FIG. 22 is a view for explaining the WFG control table shown in FIG. 21. In the drawing, reference number 31 denotes an index table. Each of the WFG control tables 30 is pointed at from the index table 31, and they are linked with each other as shown in the drawing. Besides this table, an index table for starting the deadlock detection is provided in the local memory 25 and the start point of the deadlock detection is determined with reference to the index table.

The algorithm of the deadlock detection, i.e., the processing operation of the deadlock detection unit 150 shown in FIG. 14, is explained in detail hereinafter.

(a) The processing operation to be performed in the local system starting the deadlock detection:

①The WFG within its own local system is searched, and the loop of the waiting state at the WFG of the local system is detected.

②As to a transaction related to the global WFG, whether the waiting time for the transaction is suitable or not is judged. When the transaction waits for a long time, the loop of the waiting state for the global WFG is also detected. The global WFG indicates the relationship between the transaction agents. When the relationship exists between the transaction agents, the deadlock detection is performed only in the global WFG.

③As a result of the item ①, when own agent exists, the deadlock detection to own system is performed in such a way that the subgraph is transferred to the local system and the subgraph or shortened type (both ends of the subgraph) is provided in the shared memory.

(b) The processing operation to be performed in the requested local system:

①The requested subgraph is coupled to the local WFG of own system.

② When no deadlock detection is found in the local system, and no request for another local system is found, the processing operation is completed in this step.

③As a result of the search, if the waiting transaction of another local system is found, the same processing operation recited in item (a) ② is performed.

(c) The judgement of the deadlock:

In the item (b), the cycle from the transaction of the subgraph of the requested WFG to the same transaction is found, and the above fact is judged as a deadlock. The transaction subject to the release of the deadlock is selected from the transaction at this judged system, or from the transaction constituting the subgraph. In general, the transaction having the least amount of damage when stopping the processing operation is selected based on the control information of the transaction.

FIG. 23 is a schematic block diagram of a shared memory including a data base processing system and a deadlock detection system. FIG. 24 is a schematic block diagram of a processor module including a data base processing system and a deadlock detection system.

The internal structure of the shared memory 10 used for the data base processing system is shown in FIG. 3, and the internal structure of the shared memory 10 used for the deadlock detection system is shown in FIG. 14.

In the above explanations, although the drawings are separated between the data base processing system and the deadlock detection system, in actual practice, since the deadlock occurs during the data base processing operation, the shared memory stores the transaction management information and the global WFG information, and the processor module performs the deadlock detection function using the local WFG information in the local memory and the global WFG information in the shared memory.

We claim:

1. A data base processing system in a multiprocessor system including a plurality of processor modules, each having a local memory and connected to each other through a high speed bus line, and a shared memory connected to said plurality of processor modules through said high speed bus line, said data base processing system comprising:

storage means provided in the shared memory for storing data base management information representing either an object of a shared processing operation or an object of a local processing operation for resources;

access management means provided in each of the plurality of processor modules for requesting access to the data base management information under both the shared processing operation and the local processing operation, the shared processing operation being symmetrically performed, and the local processing operation being asymmetrically performed in each of the processor modules; and control means provided in each of the plurality of processor modules for controlling a shared/local conversion to manage an access state for each of the resources; when a frequency of access is unevenly distributed to a particular processor module, the resource becomes the object of the local processing operation at said particular processor module; and when the frequency of access is not unevenly distributed to a particular processor module, the resource is determined as the object of the shared processing operation.

2. A data base processing system as claimed in claim 1, further comprising a deadlock detection system, comprising:

transaction management means for managing transactions between the processor modules;

first directed graph information means for indicating a waiting state between transactions which occur within different processor modules;

deadlock detection means for detecting a deadlock;

second directed graph information means for indicating a waiting state between said transactions which occur within said processor module; and means for separately performing local deadlock detection and global deadlock detection.

3. A data base processing system as claimed in claim 1, wherein said storage means includes means for storing share/local processing information, for storing access state information, for storing resource lock information, and for storing resources.

4. A data processing system as claimed in claim 1, wherein said access management means includes means for symmetrically requesting access to the data base management information and for asymmetrically requesting access to the data base management information.

5. A data base processing system comprising:

a high speed bus line;

storage means, operatively connected to said high speed bus line, for storing a data base having a plurality of resources therein;

a plurality of processor means for accessing the data base, each of said processor means having one of a local and a shared access state for each of the resources, and including a local memory and a CPU and being connected to said high speed bus line;

access management means for controlling access by each of said plurality of processor means to the data base including permitting access to said storage means during the shared access state and for storing a number of accesses by each of said processor means to each resource in the data base; and conversion control means for switching a selected one of said processor means between the local and shared access state depending upon the number of accesses by said selected one of said processor means to one of the resources in the data base.

6. A data base processing system as claimed in claim 5, wherein each of said processor means includes:

means for copying the one of the resources of the data base from said storage means to said local memory of a selected one of said processor means when the number of accesses by said selected one of said processor means to the one of the resources is proportionately higher than the number of accesses by other processor means; and means for accessing the one of the resources of the data base in said local memory by said selected one of said processor means during the local access state.

* * * * *

UNITED STATES PATENT AND TRADEMARK OFFICE
CERTIFICATE OF CORRECTION

PATENT NO. : 5,649,184
DATED : July 15, 1997
INVENTOR(S) : HAYASAHI et al.

It is certified that error appears in the above-identified patent and that said Letters Patent is hereby corrected as shown below:

Col. 1,     line 28, change "failling" to --falling--;
line 33, change "System" to --system--;
line 52, delete "there is".

Col. 3,     line 34, after "In" delete "the".

Col. 4,     line 10, delete "processor";
line 11, delete "between";
line 12, delete "processor"; and after "communication" insert --between processor--.

Col. 8,     line 33, change "At 61" to --In step 61--;
line 41, change "At 62" to --In step 62--;
line 44, change "At 63" to --In step 63--;
line 66, change "66," to --66 the--.

Col. 9,     line 36, after "accessing" insert --the--; and change "from the" to --from--.

Col. 11,     line 34, delete "waits".

Col. 12,     line 23, change "on" to --in--;
line 28, delete "on".

Signed and Sealed this

Sixteenth Day of December, 1997

Attest:

BRUCE LEHMAN

Attesting Officer     Commissioner of Patents and Trademarks